United States Patent [19]
von Scarpatetti

[11] Patent Number: 4,869,176
[45] Date of Patent: Sep. 26, 1989

[54] TRACK GUIDABLE OMNIBUS

[75] Inventor: Diether von Scarpatetti, Esslingen, Fed. Rep. of Germany

[73] Assignee: Daimler-Benz Aktiengesellschaft, Stuttgart, Fed. Rep. of Germany

[21] Appl. No.: 252,118

[22] Filed: Oct. 3, 1988

[30] Foreign Application Priority Data

Oct. 2, 1987 [DE] Fed. Rep. of Germany ....... 3733295

[51] Int. Cl.$^4$ ............................ B61F 9/00; B62D 1/26
[52] U.S. Cl. ...................................... 104/247; 180/131
[58] Field of Search ........................ 104/242, 247, 119; 105/3; 180/22, 131

[56] References Cited

U.S. PATENT DOCUMENTS

| | | | |
|---|---|---|---|
| 4,267,799 | 5/1981 | Binder | 104/247 |
| 4,287,830 | 9/1981 | Braun | 104/247 |
| 4,346,659 | 8/1982 | Binder | 104/247 |

FOREIGN PATENT DOCUMENTS 2643324  3/1978  Fed. Rep. of Germany .
2719705  11/1978  Fed. Rep. of Germany .

*Primary Examiner*—Robert J. Oberleitner
*Attorney, Agent, or Firm*—Barnes & Thornburg

[57] ABSTRACT

The invention relates to an omnibus track guidable vehicle for special roads which vehicle can also travel with free manual steering on normal roads. To make the trailing axle roll along the special road, which defines the track, with correct tracking and without contact, the trailing vehicle axle is provided with an elastokinematic self-steering system. Articulation of the axle body of this vehicle axle in the transverse direction is in fact made so that the axle body is transversely slidable out of the central position by approximately ±0.8 to 1.2% of the vehicle width with increasing force, limited as a function of the transverse force. Pull rods which determine the transverse position of the trailing vehicle axle are inclined symmetrically to the longitudinal direction of the vehicle to be arranged trapezoidally in plan view so that the intersection of the center lines of the pull rods, which constitutes a virtual pivot center, is located apporoximately 50 to 75% of the vehicle width behind the vehicle axle in the direction of travel. Alternative embodiments are shown for the mounting of the trailing vehicle axle with limited transverse mobility and with integrated resilient centering.

11 Claims, 5 Drawing Sheets

TRACK GUIDABLE OMNIBUS

BACKGROUND AND SUMMARY OF THE INVENTION

The invention relates to an omnibus track guidable vehicle for special roads having at least one vehicle non-steerable by itself axle which has an axle body pivotable about an upright vertical axis central of the vehicle width and staggered in the longitudinal direction of the vehicle relative to a center line of the vehicle. A pair of pull rods are provided which extend generally in a longitudinal direction of the vehicle, one on each side of the vehicle center axis. The pull rods are articulated to the axle body. Guide rods are provided, articulated to the axle body for retaining the vehicle axle in a transverse direction. The guide rods and the pull rods act in concert to prevent a rotation of the vehicle axle in, or counter to, the direction of rotation of the vehicle wheels. A yawing vibration brake is provided for attenuating yawing vibrations of the vehicle axle.

Track guidable omnibusses with transverse guidance by transverse guidance bars fitted on both sides of the special road and cooperating with transverse guidance rollers on the vehicle have problems when it comes to making the trailing axles follow the foreward track guided vehicle axle in the correct track on curves. According to DE-OS No. 2,643,324, the trailing vehicle axle is mounted in a pivotably bogie fashion. A track determining transverse guidance roller for each vehicle side is provided preceding and following the trailing axle. A total of four transverse guidance rollers, which are permanently in contact with the transverse guidance bars on the road are therefore provided for each trailing axle. The direction of the track determining transverse guidance bars is imprinted positively upon the pivotable trailing axle by these guidance rollers. The pivot center of the vehicle axle, which is non-steerable by itself but is pivotable, is dictated mechanically by fifth wheel segments and by the intersection of a pair of three-bar linkages. In view of the pivotable trailing vehicle axle running free from yawing vibrations, this pivot center lies in front of the axle center in the direction of travel. To enable braking and traction moments to be absorbed reliably during the pivoting of the trailing vehicle axle, pull rods are made variable in length by integrated piston/cylinder units. The chambers of these piston/cylinder units, arranged on the right and on the left side of the vehicle being mutually interconnected. Consequently, a pivoting of the trailing axle is possible, but not a rotation of the axle body either in, or counter to, the direction of rotation of the wheels. These piston/cylinder units may also serve as a yawing vibration brake in common with a connection with a throttling action. In view of the fact that the wheels of the pivotable trailing vehicle axle are always aligned precisely parallel to the track determining transverse guidance bars, the wheel plane of the vehicle wheels always coincides with the direction of travel. It is impossible for an oblique angle to develop between wheel plane and direction of travel. Consequently, transverse forces which occur, have to be absorbed completely by the track determining transverse guidance rollers and are transmitted into the transverse guidance bars. The transverse guidance rollers are therefore stressed permanently and very highly when transvers forces occur and thus they must be dimensioned correspondingly to accept this loading. This raises problems of space and weight. The pivotable guidance of the trailing vehicle axle by means of fifth wheel segments or by means of a complete fifth wheel is also highly onerous and heavy. Nonetheless, in view of the fastening of the axle, a maximum of seven degrees of angle pivoting stroke can be permitted at each side. Although the majority of curves which occur can be travelled with correct tracking with such a pivot angle, tighter curves also occur which would necessitate an even greater pivot angle of the trailing vehicle axle. To enable even such curves to be negotiated without obstruction, the transverse guidance bar on the road on the inside of the curve must be offset inwards, so that the trailing vehicle axle can trail offset towards the inside of the curve. A disadvantage of this mode of vehicle axle trailing, in correct tracking within the track determining special road, lies in the expensive, complicated and heavy construction of the trailing vehicle axle and its suspension, which involves various operational disadvantages. Also, in the transition to trackless manually steered operation, the pivotable vehicle axle must be provided with an onerous transverse position locking means which cancels out the pivotability. This increases the expense and complicates the axle construction to a further degree.

This costs in money, space and cumbersome mechanisms has not in fact been undertaken in the practical construction of omnibusses, but essentially a rigid and immovably mounted trailing vehicle axle has been retained. A so-called push roller has been associated on each side of the trailing vehicle axle, which rollers project only slightly beyond the side flanks of the vehicle wheels so that they do not come into contact with the track determining transverse guidance bars normally, but only in curves. When travelling curves these push rollers push the vehicle forcibly towards the outside of the curve, so that the trailing vehicle axle can follow the track determining road even without pivoting. When travelling a curve slowly, when virtually no centrifugal forces occur, the trailing vehicle axle has a tendency to trail offset towards the inside of the curves. When travelling a curve slowly, the push roller on the inside of the curve is therefore stressed, and in fact more strongly stressed as the curve is made tighter. With increasing speed of travel in curves, an influence of centrifugal force occurs, which tends to push the vehicle to the outside of the curve. This causes a relief of the push roller on the inside of the curve at moderate speeds of travel. At a suitable speed when travelling a curve, a condition may arise in which the trailing vehicle axle rolls between the track determining transverse guidance bars with correct tracking even without contact of the push roller. In this travel condition, the outwardly directed influence of centrifugal force and the inwardly directed tendency to lateral offset the trailing vehicle axle just cancel each other. When travelling a curve even faster, the influence of centrifugal force may predominate, so that in such a condition the push roller on the outside of the curve contacts the associated transverse guidance bar and is more or less heavily stressed depending upon the valve of the speed of travel and corresponding centrifugal force. This travelling condition can arise in practice when the existing track determining roads are travelled at relatively high travelling speeds. In vehicles which have no push rollers on the trailing vehicle axles, the outer flank of the vehicle wheels comes into contact with the track determining transverse guidance bar, so that the tire is chafed on the side flank in a relatively short time. Although it is possible to travel through a track determining road without contact, even without push rollers on the trailing vehicle axles, it is necessary for this purpose to adhere to a quite specific speed range, which is a function of the radius of curvature of the curve and of the degree of the banking of the road in the region of the curve. These two together determine the so-called design speed of a curve. Experience has shown that the range of speeds with which a curve can be travelled with correct tracking by the trailing vehicle axle without contact, is narrower as the design speed of the curve is higher. In such cases, even slight excesses of the design speed result in an outside chafing of the tires or in an outside contact of the push roller. When travelling too slowly the tires on the inside of the curve chafes at the side, or the push roller on the inside of the curve contacts the transverse guidance bar. Although the chafing of the tire flanks against the transverse guidance bar can be prevented by the installation of push rollers, nonetheless the latter are also not problem free, because frequently they cannot be accommodated for reasons of space, and because if they are small, they can be stressed only lightly or only for a short time. Under protracted high stress, the push rollers become worn relatively quickly, particularly if they are used in hot climates and can become heated inadmissibly intensely by thermal absorption from the transverse guidance bars, intensely by solar radiation and intensely due to self-heating by rolling friction in the covering of the push roller.

The object of the invention is to develop a track guidable vehicle omnibus which is of simple construction in the region of the trailing vehicle axle and which, even without push rollers, can travel through the special road without contact by the trailing vehicle axle within a relatively wide range of speeds around the design speed of a curve.

In order to achieve this object the invention, the non-steerable by itself vehicle axle is free as concerns pivoting without engagement by the track guidance rails and pivots as a function of transverse acting forces in a pivotal range of approximately ±0.8 to 1.5 degrees of angle around an exact transverse position and elastokinematically counter to the direction of the transverse force. This pivoting is due to the articulation of the guide rods which restrain the axle body of the vehicle non-steerable by itself axle in the transverse direction. Further, the axle body is transversely and limitedly slidable transversely of the vehicle longitudinal control axis as a function of the transverse force applied. This limited sliding is equal t a distance approximately ±0.8 to 1.2 % of the vehicle width with the actual amount of sliding being proportional to the amount of force being applied. The pull rod means are provided to be unyielding in the longitudinal direction and are inclined symmetrically with respect to the vehicle central axis, as viewed in plan in the longitudinal direction of the vehicle, to define a trapezoid. An intersection of a kinematically effective center lines of the plural pull rods constitutes the vertical pivot center for the axis body means and is located approximately in the direction of travel of the vehicle behind the vehicle non-steerable by itself axle at a distance approximately equal to 50 to 100% of the vehicle width.

This provides an omnibus vehicle having a trailing vehicle axle connected conventionally to the vehicle body, in which the elements of the axle suspension, which are always present in any case, are modified in themselves and/or installed in a modified way. Where an additional structural outlay is necessary, it is only slight and requires scarcely any additional space or weight. The improved tracking ability of the trailing vehicle axle across a wider range of speeds around the design speed of a curve is possible because of a greater oblique running angle between the wheel plane and direction of travel and can be adjusted automatically as a function of the transverse forces applied. This pivot angle, which results from the pivotability of the trailing vehicle axle, is added to the oblique running angle which is adjusted automatically. Even with the rigid rear axle, when the vehicle is travelling at design speed with correct tracking and without contact with the track through a curve of a track determining road, an oblique running angle exists between wheel plane and direction of travel, due to which the vehicle wheels can absorb transverse force due to centrifugal force and transmit it into the road. By virtue of the pivotability according to the invention, this oblique running angle is increased by the angular amount of the pivotability of the trailing vehicle axle, so that the trailing vehicle axle has an increased load capacity in the transverse direction. In particular, the range of speeds at which a curve can be travelled without contact and with correct tracking has been considerably widened. Therefore a side contact of the push rollers, which are recommended for security, can be restricted to a few extreme cases in which a temporary stressing of the push rollers is acceptable.

An additional advantage is obtained by having the guide rods, which provide for the transverse sliding of the vehicle axles, to be telescoping in nature and thus to effect the limited movement by limiting the amount of telescoping of these guide rods. An expedient manner of providing for this telescoping is by the use of a piston in a cylinder, which piston is constructed with a circular rubber/metal sleeve means which limits and centers the piston in the cylinder. The ends of the cylinder can also be provided with a similar circular rubber/metal sleeve which grasps the rod of the piston. This piston can also serve as the hydraulic yawing vibration brake for the vehicle.

Another feature of the invention is to have guide rods which restrain the vehicle axle in the transverse direction to act in concert with the push rods to also secure against rotation in, or counter to, the direction of rotation of the wheels by means of forming these guide rods as a pair of three bar linkages placed triangularly as viewed in plan. Each pair of these three bar linkage means are connected articulately at an end to a rocker arm connected to the vehicle axle body to form a trapezoidal four bar linkage. The connection of the rocker arm to the axle body is obtained by an articulation joint arranged centrally of the rocker arm. With this type of operation, a buffer means can be provided to abut the guide rod to restrain the transverse movement The articulation joint can also be constructed as a rubber/metal bearing to provide a centering effect on the rocker arm itself. The rocker arm can also have an extension member extending beyond the guide rod and which has a hydraulic shock absorber attached thereto which will serve as a yaw vibration brake.

Additionally, a pair of push roller means can be mounted on the axle body means ahead of the vehicle wheels on both sides of the vehicle to provide for restricted contact with the track when, in those rare instances, excess forces are applied. In order to keep these push roller means from contacting the rails normally, they are located one apart from the other a distance greater than the width of the outside of the vehicle wheels on the axle, but less than the distance between the vehicle rails which define the guidance path for the track guidable vehicle.

Other objects, advantages and novel features of the present invention will become apparent from the following detailed description of the invention when considered in conjunction with the accompanying drawings

DETAILED DESCRIPTION OF THE DRAWINGS

Figure 1:
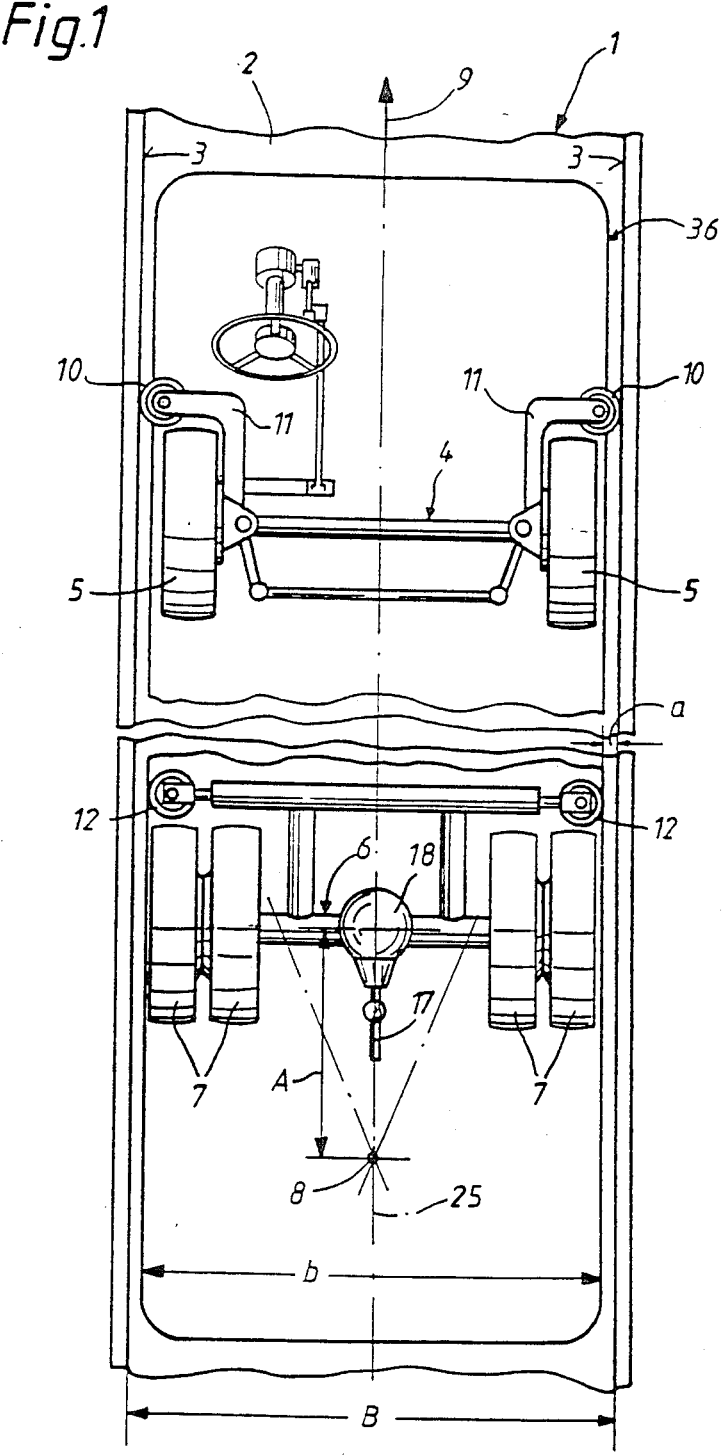
FIG. 1 shows a schematic plan view of a track guidable omnibus on a track determining special road.

FIG. 1 shows a track guidable omnibus 36 on a track determining special road 1, having track determining transverse guidance bars 3 on both sides of the road surface 2. The inside width between these two transverse guidance bars 3 (dimension B) is approximately 10 cm greater than the overall width (dimension b) of the omnibus 36

The omnibus can be selectively operated either in a track guidably manner on the special road illustrated, or also tracklessly by means of manual steering on normal roads. The front vehicle axle 4 is manually steerable. A transverse guidance rollers 10 for the front wheels 5 are mounted ahead of the front wheels 5, preceding in the direction of travel 9. The overall distance between opposite transverse guidance rollers 10 is slightly greater than the inside width (dimension B) between the opposite transverse guidance bars 3, so that the transverse guidance rollers 10 contact the respective transverse guidance bars 3 with a slight pretension. The transverse guidance rollers 10 are relatively immovably connected with the respective vehicle wheels 5 and the manual steering by a support arm 11 and thus they therefore follow the manual steering movement of the steerable vehicle wheels 5. Conversely, in the case of track guided operation, the direction of travel for wheels 5 is imparted to the vehicle wheels 5 by the transverse guidance bars and the transverse guidance rollers 10. The transverse guidance rollers 10 are stressed solely by steering forces and not by transverse forces due to centrifugal force or forces caused by side winds. The steerable vehicle wheels 5 can be adjusted obliquely to the direction of travel, that is to say obliquely to the track determining transverse guidance bars 3, so that a transverse force can develop between the tread surface of the tire and the road surface 2.

A trailing vehicle axle 6 is provided which is non-steerable by itself and which carries twin wheels 7 (due to the heavier vertical load) and is fitted in the rear region of the omnibus 36. The axle body 15 of the trailing vehicle axle 6 is pivotable about a vertical axis 8, which according to the invention is located behind the trailing vehicle axle 6 in the direction of travel 9. In the embodiment illustrated, the omnibus 36 is represented solely as a single-cell omnibus with a total of two vehicle axles, so that the trailing vehicle axle 6 is the rear axle and is driven by an engine 16 (FIG. 2) arranged in the rear region through an articulated shaft 17 and a differential gear 18. The description which follows applies not only to the embodiment of the rear axle of a single-cell omnibus, but also to embodiments for each of trailing vehicles axles of multi-cell articulated omnibusses. In articulated busses the trailing vehicle axle of the front carriage is generally not driven and only the trailing vehicle axle of the trailer carriage is driven.

Figure 2:
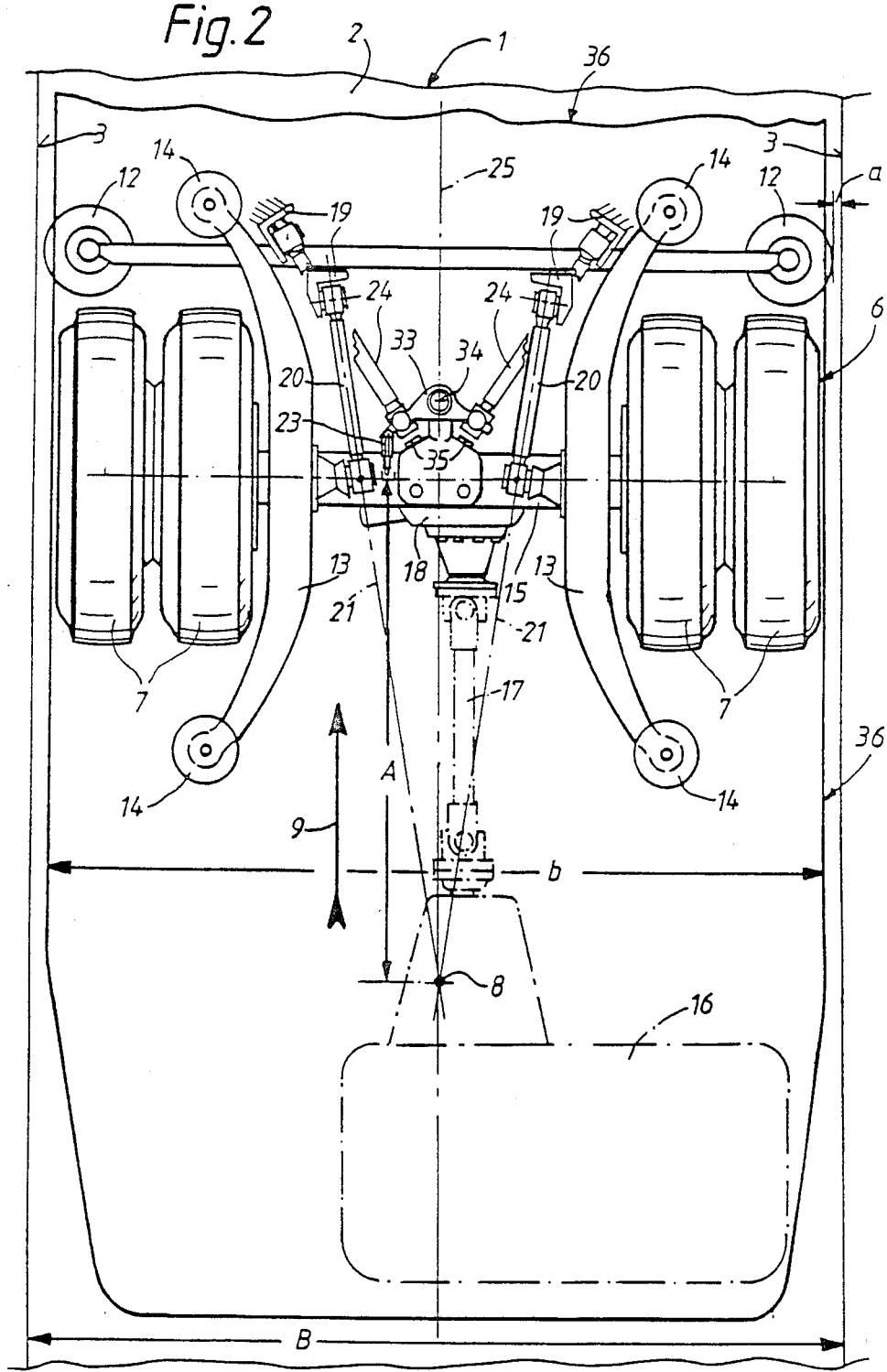
FIG. 2 shows the rear region of the omnibus according to FIG. 1 on a larger scale, viewed from the bottom of the vehicle and showing the pivotability according to the invention.
Figure 3:
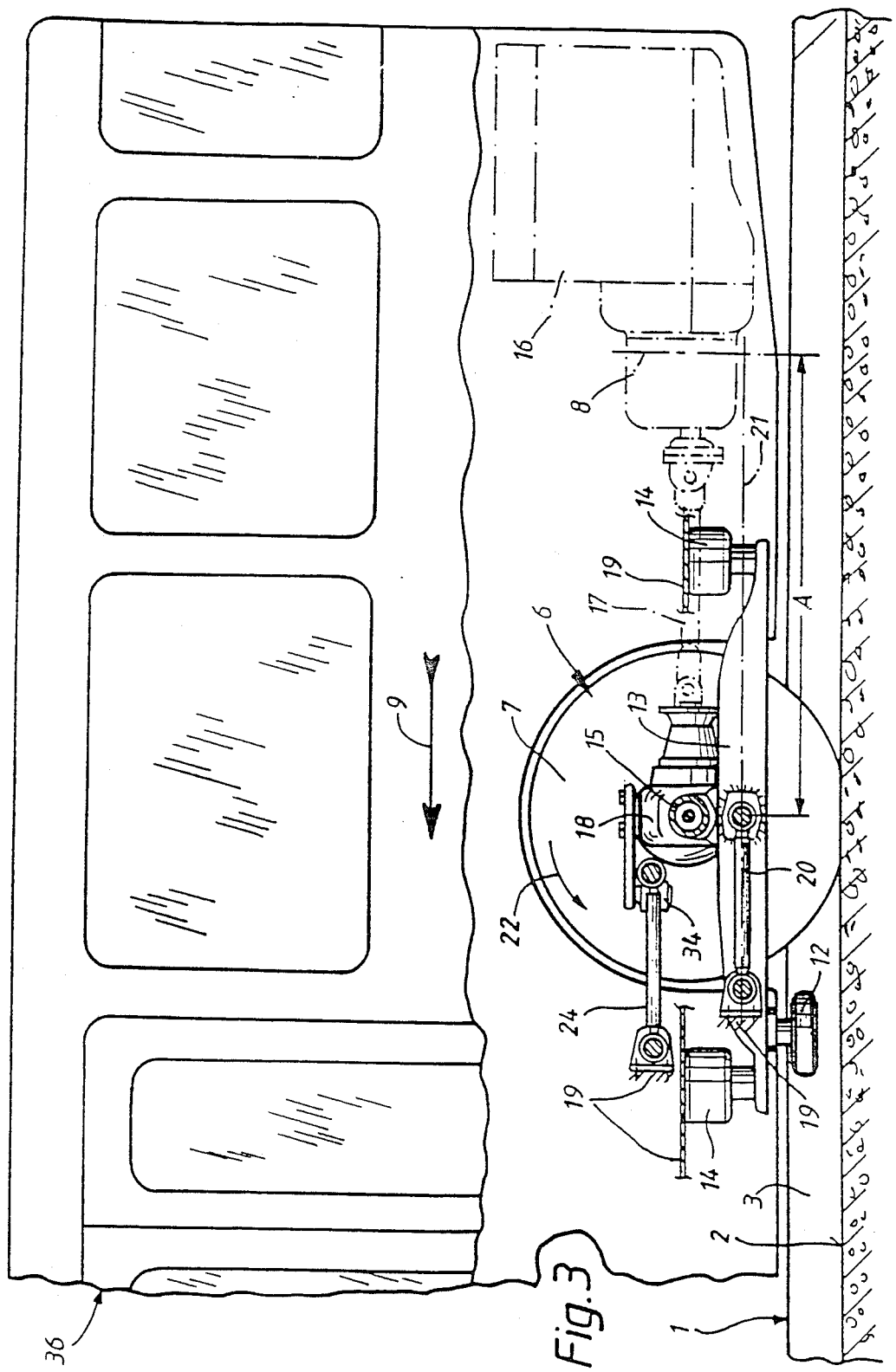
FIG. 3 shows a side elevation of the rear part of the omnibus.

The trailing vehicle axle 6 is connected towards its center to right and left spring brackets 13 extending substantially in the direction of travel. These brackets 13 are attached at their front and rear ends to pneumatic spring bellows 14, by which the vehicle body 19 of the omnibus 36 is braced in the direction of gravity. As FIGS. 2 and 3 show, the axle body 15 of the trailing vehicle axle 6 is anchored in the transverse direction by two pull rods 20 which engage the springs 13, to right and to left of the vehicle center, and beneath the axle body 15. The pull rods 20 are located substantially parallel to the longitudinal direction of the vehicle, but with a slight trapezoidal inclination which will be discussed more fully below. A further pair of guide rods 24 engage the axle body 15 from above and are triangular in plan orientation while being arranged symmetrically to the vehicle center line 25. These guide rods 24 determine the transverse position of the trailing vehicle axle 6 and in concert with the pull rods 20, prevent a rotation of the vehicle axle 6 in the wheel rotation direction 22 (FIG. 3) during braking or counter to that direction of rotation during acceleration.

Instead of a triangular arrangement of the guide rods 24, the function of the guide rods could also be performed by an individual centrally arranged pull rod in the region of the top of the differential gear 18 and by an individual control arm. It should also be mentioned that the articulations of the lower pull rods 20 and of the upper guide rods 24 exhibit approximately an equal interval in the longitudinal direction of the vehicle, so that the pull rods 20 and the guide rods 24 form a four bar linkage in side elevation with the axle body 15 (FIG. 3). Thus the trailing vehicle axle 6 is guided substantially parallel during springing. That is to say no rotary vibrations due to springing are superimposed as they would be prejudicial both to the articulated shaft 17 and also during a braking operation.

To permit the trailing vehicle axle to travel with correct tracking through curved regions of the special road within a relatively wide range of speeds and without causing side contact of the wheels 7 or push rollers 12 with the transverse guidance bars 3, the trailing vehicle axle 6 is pivotable about a vertical axis 8, located behind the axle 6 in the direction of travel 9. The actual vehicle axle 6 is left fully independent as regards pivoting. That is to say, it exhibits no separate track guidance means such as guidance rollers 10 at the front wheels, which are operatively associated to be in contact or out of contact with the roadside track guidance means 3. The trailing vehicle axle 6 is made elastokinematically self-steering by its contact with the track guidance means and counter to the direction of the transverse force through approximately an ±0.8 to 1.5% angle about its exact transverse position. For this purpose, the articulation of the triangularly arranged guide rods 24, which retain the axle body 15 in the transverse direction, are constructed so that the axle body 15 is transversely slidable with increasing force through approximately ±0.8 to 1.2% of the vehicle width (dimension b) out of the center position. Due to this limited transverse sliding mobility of the trailing vehicle axle 6 relative to the vehicle body 19, the axle 6 can pivot about the pivot center vertical axis 8 located behind the center of the axle in the direction of travel 9.

The steering effect directed counter to the transverse force action is produced by the backward shift of the vertical axis. The position of the vertical axis 8 as the virtual pivot center is determined by the fact that the pull rods 20 are arranged symmetrically inclined to the center line 25 in plan view and in a trapezoidally manner. The intersection of the kinematically effective center lines 21 of the pull rods, which determines the position of the vertical axis 8, is located approximately 50 to 75% of the vehicle width (dimension b behind the center of the vehicle axle 6 (Dimension A). In view of the triangular arrangement of the guide rods 24 and in order to permit a limited transverse sliding mobility of the vehicle axle 6, or of its axle body 15, relative to the vehicle body 19, the two guide rods 24 are mutually articulately connected with their ends facing each other and the axle body 15 to a rocker arm 33 (FIG. 2). The guide rods 24 form a trapezoidal plane with the rocker arm 33 and constitute a symmetrical four bar linkage. The rocker arm 33 is in turn connected by a joint 34 arranged centrally on the axle body 15. The joint 34 is also shifted forwards in the direction of travel 9 relative to the joints between the rocker arm 33 and the guide rods 24. This results in a certain straight guidance of the joint 34 for movements of the rocker arm. The center of the rocker arm 33 moves approximately on a line located transversely to the vehicle center line 25.

In order to limit the transverse sliding mobility of the axle body 15 relative to the vehicle body 19, the movement play of the above-mentioned trapezoidal four bar linkage is restricted. For this purpose stop buffers 35, which are attached symmetrically to the axle body 15, cooperate with end faces of the associated guide rods 24 of the pair of three bar linkages, one at a time. In order to keep the trailing vehicle axle 6 in the exact central position, in spite of the limited transverse mobility when the omnibus 36 is travelling normally straight ahead, the resilient centering of the vehicle axle 6 within the transverse mobility range is realized by the pivot bearings on the rocker arm 33, i.e. the central joint 34 between the rocker arm 33 and the axle body 15 as well as the two joints between the rocker arm 33 and the adjacent guide rods 24. These two joints are constructed as rubber/metal bearings. A relatively thick cylindrical or spherical rubber interlay fitted on both sides in the movement gap between journal and bearing bush becomes stressed in shear upon movement of the joint. This rubber interlay generates a sliding moment and acts as a centering spring. These centering springs cause not only a centering of the vehicle axle 6 when travelling without transverse forces, but an equilibrium position within the transverse displacement range when travelling under the influence of transverse forces, so that a more or less pronounced deflection of the vehicle axle 6, out of the central position, and consequently also, a more or less pronounced pivoting of the same, counter to the direction of the transverse force action, occurs as a function of the transverse forces. This automatically operating elastokinematic steering effect is also obtained even without separate engaging roadside track guidance means. This non-roadside track guidance means happens without contact of any push roller 10 with one of the transverse guidance bars 3 such as occurs at the front wheels 5.

The rear carriage is also provided with push rollers 12 which project slightly outwards compared to the external side flank of the vehicle wheel 7. The push rollers 12 are definitely set back in relation to the transverse position of the track determining surface of the transverse guidance bar 3, so that a certain clearance "a" results. The push rollers 12 are therefore not operative for an elastokinematic self-steering of the trailing vehicle axle 6, even when a push roller 12 is attached to the vehicle axle 6. Only when travelling greatly above (or below) the range of speeds within which a curve of the track determined special road can be travelled, is the omnibus displaced so far in the one or other direction on the road surface 2 that the push roller 12 contacts the corresponding transverse guidance bar 3. However, by virtue of the elastokinematic self-steering effect of the trailing vehicle axle, the stressing of the push roller is only relatively moderate, even in the case of a major deviation from the design speed when travelling curves, because a considerable fraction of the acting transverse force has already been decayed by the utilization of the elastokinematic self-steering effect. The push rollers 12 therefore serve only as an extreme safety measure. In order to obtain yet an additional steering effect in the desired direction, they are arranged preceding the trailing vehicle axle 6 in the direction of travel 9. Even if the elastokinematic steering range is exhausted by virtue of the resilient construction of the pivot bearings on the guide rods 24 and/or on the pull rods 20, a small additional possibility of movement is obtained within the longitudinal elasticity of the guide rod articulation.

In order to prevent the deliberately guided pivotable, trailing vehicle axle, from developing yawing vibrations, a yawing vibration brake 23 is provided at a suitable point. In the exemplary embodiment according to FIG. 2 this is realized by the rocker arm 33 being prolonged at one end beyond the guide rod joint and coupled there to a hydraulic shock absorber which assumes the function of the yawing vibration brake 23. When yawing vibrations of the trailing vehicle axle 6 occur, the rocker arm 33 likewise executes yawing vibrations within an even greater angle than the vibrational swings of the trailing vehicle axle 6. It is therefore more convenient to damp the yawing vibrations on the rocker arm 33 than on the axle body 15 of the trailing vehicle axle.

The ends of the hydraulic shock absorber remote from the rocker arm 33 may also be fastened to the body 19 of the omnibus 36 and not to the axle body 15, because when yawing vibrations of the vehicle axle 6 occur, the vibrational swings of the rocker arm 33 relative to the vehicle body are greater than the corresponding vibrational swings relative to the axle body 15. Therefore if the hydraulic shock absorber is anchored to the body, yawing vibrations of the rocker arm 33, and therefore yawing vibrations of the vehicle axle 6, can be more effectively attenuated. The shock absorbers is shown articulated to both ends of the rocker arm 33, which have the advantage of a certain redundancy. However, since shock absorbers nowadays represent a trouble free component, the idea of a redundancy gives way to considerations of weight. A shock absorber with surfaces twice as large, is only trivially larger and heavier than two shock absorbers of single surface size. Thus, a larger shock absorber would do away with the redundancy and corresponding articulation eyes and assembly processes would also be eliminated.

In customary omnibusses having an upper pair of three bar linkages, the axle articulation points of the guide rods 24 are associated rigidly with the axle body 15. In FIG. 2 these articulation points are associated with the axle body 15 movably through the rocker arm 33. However, this presupposes a modification in the articulation region of the guide rods 24 on the axle body 15 compared to the conventional construction.

Figure 4:
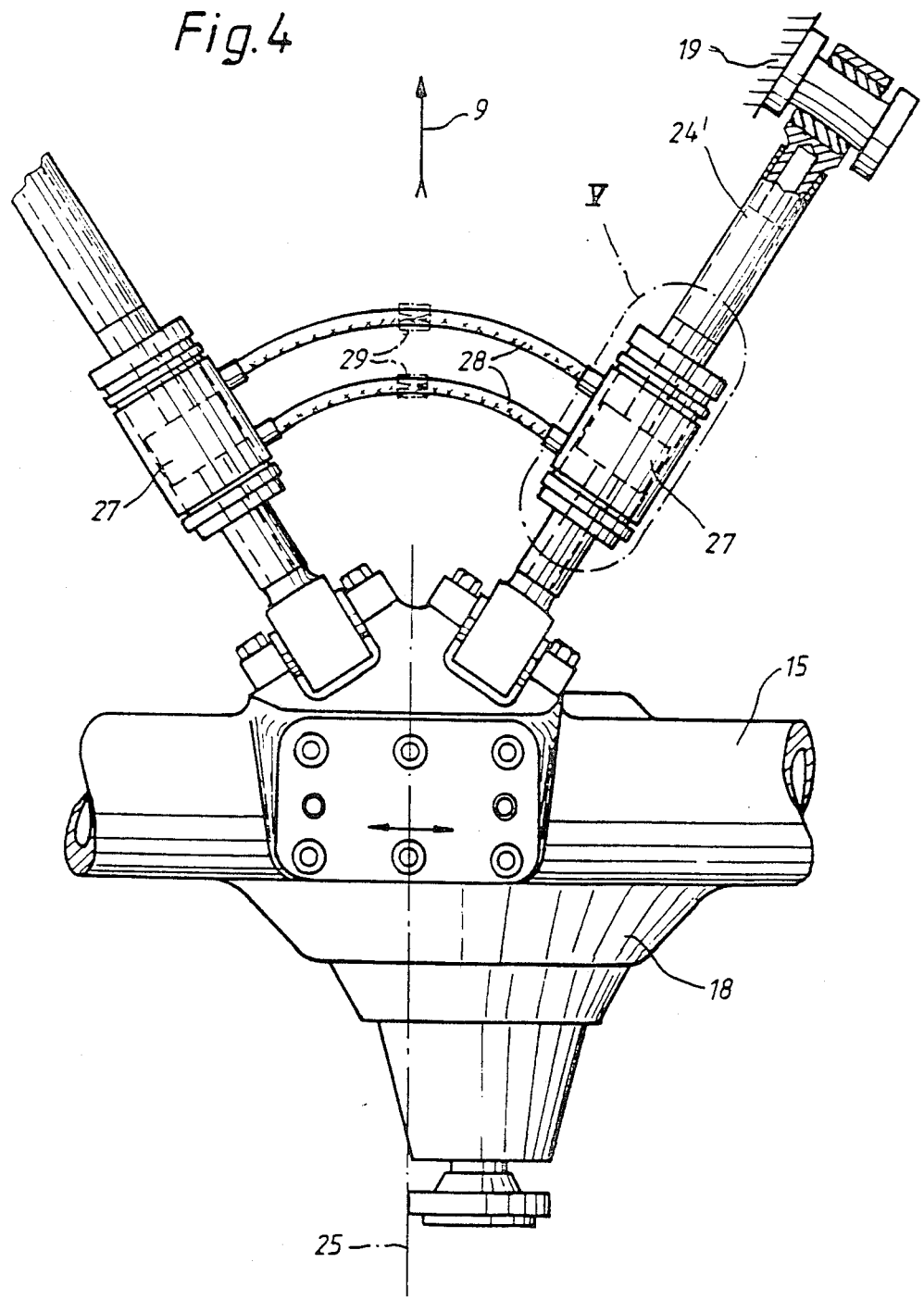
FIG. 4 shows a detail of the three bar linkage of a modified exemplary embodiment of a pivotable arrangement of the trailing vehicle axle.
Figure 5:
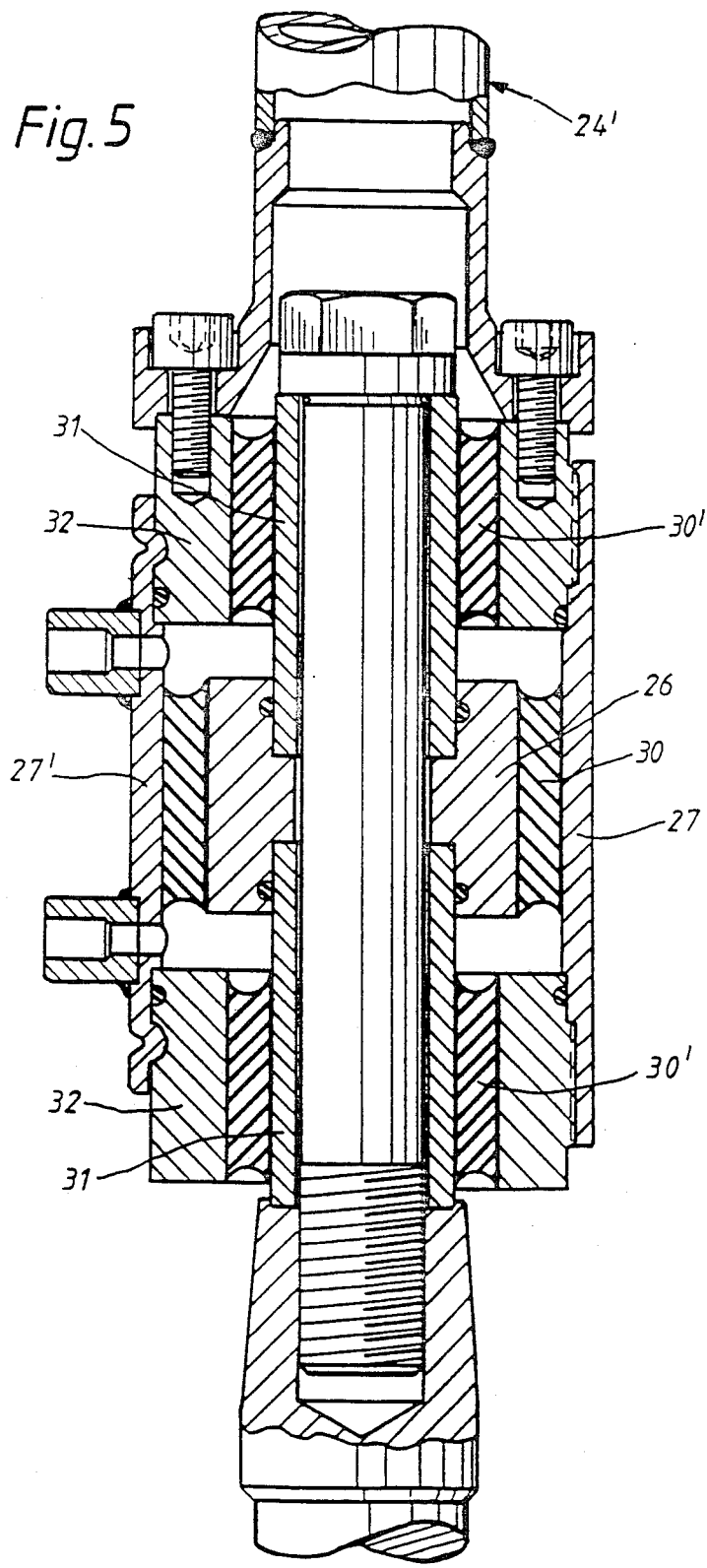
FIG. 5 shows a detail of the piston/cylinder unit of one of the three-bar linkages from FIG. 4.

In the embodiment according to FIGS. 4 and 5 this modification is shifted entirely into the guide rod 24 assembly, so that the articulation points in the region of the axle body 15 can also be left unmodified as compared to a conventional omnibus construction. Here the limited transverse sliding mobility of the axle body 15 of the trailing vehicle axle 6 relative to the vehicle body is obtained by a limited telescopability of the guide rods 24'. In the case of a transverse shift of the axle body 15 relative to the vehicle center line 25, the one guide rod 24' becomes shortened and the other correspondingly lengthened, with a slight change of inclination. The guide rods 24' of telescopable construction are integrated structurally with a piston/cylinder unit consisting of piston 26 and cylinder 27, and the piston/cylinder unit serves as a hydraulic yawing vibration damper. Consequently a separate yawing vibration brake engaging the axle body 15 of the trailing vehicle axle 6 may also be omitted, so that the modification, which is still necessary, is shifted into the guide rods 24'.

A particularly advantageous exemplary embodiment of a suitable piston/cylinder unit is illustrated on a larger scale in FIG. 5. The piston rod passages in the piston/cylinder end 32, and the piston 26, are respectively constructed as a donut shaped rubber/metal sleeve, which achieves a functional fusion of a sealing and a resilient centering of the piston/cylinder unit. Furthermore, different variants of embodiment are represented in the left half and right half of FIG. 5 for the cylinders 27' and 27. Both these different variants differ only in the fastening of the ends 32 of th cylinder to the associated cylinder 27 or 27'. Whereas the cylinder 27 illustrated on the right is screwed to the cylinder ends 32, the fastening of the cylinder 27' shown on the left is effected by an embossed circumferential rolling with the end 32.

The cylinder 27 or 27' communicates with the piston 26 through an annular rubber interlay, fitted adherently all round the piston and which serves as a rubber spring 30 while also simultaneously effecting the sealing of the piston within the cylinder 27 or 27'. Precise and smooth machining of the piston and of the cylinder inner wall is not necessary in this case. Similarly the piston rods 31 constructed as sleeves are connected to the likewise annular cylinder end 32 by an annular rubber interlay. This rubber interlay is adherently vulcanized to both the parts 31 and 32. All three parts are connected firmly to an articulation eye of the guide rod 24' by a screw which penetrates the sleeve-shaped piston rods 31 and the piston 26. The cylinder end covers 32 and the piston 26 each form end face stops to delimit a definite longitudinal stroke of the telescopable guide rod 24'.

The respective chambers enclosed between the cylinder covers and the piston become larger or smaller and correspondingly displace volumes of liquid contained in them. In the case of a transverse shift of the axle body 15 relative to the vehicle body 19, the chamber of the guide rod facing the axle becomes larger and the corresponding chamber of the other guide rod becomes smaller due to the fact the two mutually corresponding chambers of opposite guide rods are connected by means of a connecting pipe 28 (see FIG. 4). The fluid that is displaced from one chamber in one strut is correspondingly absorbed by its correspond chamber on the other strut. The two chambers located further from the axle body 15 are also interconnected in the same manner by means of a connecting pipe 28. Throttles 29 are incorporated in the connecting pipes 28, so that a work dissipating resistance is presented to the sliding of the piston 26. By virtue of this throttle effect the piston/cylinder units can assume the function of a yawing vibration brake.

It would also be possible to connect the two chambers located in front of and behind the piston 26 of a specific piston/cylinder unit together by a throttling interconnected pipe in order to obtain the effect of damping of the yawing vibrations. In view of the fact that the guide rods 24' in triangular arrangement have the additional function to isolate the axle body 15 from traction and braking moments in concert with the pull rods 20, during simultaneous axial stressing of both guide rods 24' and both piston/cylinder units, the corresponding pistons 26 must not move. This principle is only ensured if the chambers of the two piston/cylinder units are interconnected together in the manner illustrated in FIG. 4. Therefore in the case of equal intensity axial pressure upon both pistons 26, it is impossible for the pistons to slide within the cylinder 27 as the pressure in all the four chambers are of equal value.

By virtue of the arrangement of the piston/cylinder unit integrated in the guide rod, it is possible to effect a locking of the transverse position or central position of the axle body 15 very simply if so desired. It is in fact only necessary for shut-off valves to be arranged in the connecting pipes 28. After the transition of track free travel, these shut-off valves are closed in a condition when the vehicle is moving straight ahead without transverse forces. Thus, the guide rods 24' lose their telescopability and then act purely as rigid connecting rods. However, such a locking of the trailing vehicle axle in the transverse position also cancels the elastokinematic self-steering of this vehicle axle. This elastokinematic self-steering is entirely advantageous even in trackless operation. For example, it reduces sensitivity to side wind and also achieves correct track running in curves negotiated at speed, which is likewise advantageous.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. An omnibus track guidable vehicle for special roads, having at least one vehicle non-steerable by itself axle which has an axle body means pivotable about an upright vertical axis central of the vehicle width and arranged staggered in the longitudinal direction of the vehicle relative to a center line of the vehicle axis;

a pair of pull rod means extending generally in a longitudinal direction of the vehicle with one to the right and one to the left of the vehicle center line;

the pull rod means being articulated to the axle body of the non-steerable by itself vehicle axle;

guide rod means articulated to the axle body of the vehicle non-steerable by itself axle in a transverse direction;

said guide rod means and said pull rod means acting in concert to prevent a rotation of this vehicle non-steerable by itself axle in, and counter to the direction of rotation of the wheels;

a yawing vibration brake means is provided for attenuating yawing vibrations of the vehicle non-steerable by itself axle relative to the vehicle;

said non-steerable by itself vehicle axle being free to pivot, without engaging track guidance means on the road, as a function of transverse forces in a pivotal range of approximately ±0.8° to 1.5° of angle around an exact transverse position and elastokinematically counter to the direction of the transverse forces due to articulation of the guide rod means which restrain the axle body means of the vehicle non-steerable by itself axle in the transverse direction;

the axle body means being limitly slidable transversely of the vehicle longitudinal control axis as a function of the transverse forces, through a distance approximating ±0.8 to 1.2% of the vehicle width with the amount of the transverse distance out of the center position increasing with increasing force;

said pull rod means, being unyielding in longitudinal direction and inclined symmetrically with respect to the vehicle central axis as viewed in plan, in the longitudinal direction of the vehicle, to define a trapezoid; and wherein an intersection of kinematically effective center lines of the plural pull rod means, constituting a pivot center for the axle body means, is located approximately in a direction of travel of the vehicle behind the vehicle non-steerable by itself axle a distance equal to 50 to 75% of the vehicle width.

2. An omnibus vehicle according to claim 1, wherein the guide rod means are capable of being telescoped and wherein the limited transverse sliding mobility of the vehicle axle body is effected by a limited telescopability of the relevant guide rod means.

3. An omnibus vehicle according to claim 2, wherein the telescopable guide rod means are structurally integrated with a piston/cylinder means which in turn serves as a hydraulic yawing vibration brake.

4. An omnibus vehicle according to claim 3, wherein the piston/cylinder means includes a cylinder, a piston, a piston rod and cylinder end covers and wherein the end covers, the piston and the cylinder are respectively constructed as circular rubber/metal sleeve means which effect a functional fusion sealing of the piston in the cylinder with a resilient centering of the piston in the cylinder.

5. An omnibus vehicle according to claim 1 wherein the guide rod means which restrain the vehicle non-steerable by itself axle in the transverse direction and in common with the plural pull rod means secure against rotation in an counter to the direction of rotation of the wheels, are formed as a pair of three-bar linkages placed triangularly as viewed in plan;

said pair of three-bar linkages being connected articulately to each other at ends facing each other and to the axle body means by a rocker arm means to form a trapezoidal plane four-bar linkage; and wherein the rocker arm means is connected to the axle body means by an articulation joint arranged centrally on the rocker arm means.

6. An omnibus vehicle according to claim 5, wherein a respective stop buffer means is provided to cooperate with an end face of the guide rod means of the pair of three-bar linkages limit to restrain movement in the transverse direction and which is attached to the axle body means.

7. An omnibus vehicle according to claim 6, wherein the articulation joint on the rocker arm is constructed as rubber/metal bearing means which effects a resilient centering of the rocker arm means and the axle body means.

8. An omnibus vehicle according to claim 5, wherein the articulation joint on the rocker arm is constructed as rubber/metal bearing means which effects a resilient centering of the rocker arm means and the axle body means.

9. An omnibus vehicle according to claim 8, wherein the rocker arm means has a prolongation extending beyond the guide rod articulation which is coupled to a hydraulic shock absorber means and which serves as a yawing vibration brake.

10. An omnibus vehicle according to claim 5, wherein the rocker arm means has a prolongation extending beyond the guide rod articulation which is coupled to a hydraulic shock absorber means and which serves as a yawing vibration brake.

11. An omnibus vehicle according to claim 1, wherein a push roller means is mounted on the axle body means ahead of vehicle wheels on both sides of the vehicle non-steerable by itself axle and which push roller means projects slightly beyond the respective vehicle wheel outwardly of the vehicle a distance smaller than the inside distance between opposite transverse guidance bar means which determine the track for the special road.

* * * * *